(12) United States Patent
Muljono

(10) Patent No.: US 7,455,250 B2
(45) Date of Patent: Nov. 25, 2008

(54) ELECTROSTATIC SPRAY ASSEMBLY

(75) Inventor: Eric Budi Muljono, Derry, NH (US)

(73) Assignee: Spraying Systems Co., Wheaton, IL (US)

( * ) Notice: Subject to any disclaimer, the term of this patent is extended or adjusted under 35 U.S.C. 154(b) by 4 days.

(21) Appl. No.: 11/056,703

(22) Filed: Feb. 11, 2005

(65) Prior Publication Data

US 2005/0194476 A1    Sep. 8, 2005

Related U.S. Application Data

(60) Provisional application No. 60/544,269, filed on Feb. 12, 2004.

(51) Int. Cl.
*B05B 5/00*    (2006.01)

(52) U.S. Cl. .................... 239/696; 239/690.1; 239/695; 239/707; 239/566

(58) Field of Classification Search ......... 239/690–708, 239/3, 548, 556, 566, 406; 361/225–229; 118/620–629
See application file for complete search history.

(56) References Cited

U.S. PATENT DOCUMENTS

| | | | |
|---|---|---|---|
| 3,618,858 A | * | 11/1971 | Culp ........................... 239/696 |
| 4,703,891 A | | 11/1987 | Jackson et al. |
| 4,801,086 A | * | 1/1989 | Noakes ........................... 239/3 |
| 4,962,885 A | * | 10/1990 | Coffee ............................ 239/3 |
| 5,052,617 A | * | 10/1991 | Colclough et al. ............. 239/4 |
| 5,165,601 A | * | 11/1992 | Rodenberger et al. .......... 239/3 |
| 5,332,154 A | * | 7/1994 | Maier et al. ..................... 239/3 |
| 6,003,794 A | | 12/1999 | Hartman et al. |

\* cited by examiner

*Primary Examiner*—Len Tran
*Assistant Examiner*—Jason J Boeckmann
(74) *Attorney, Agent, or Firm*—Leydig, Voit & Mayer, Ltd.

(57) ABSTRACT

An electrostatic spraying assembly is provided. The spraying assembly includes a housing having a fluid inlet passage that is connectable to a fluid source and communicates with a plurality of discharge passageways each of which extends through the housing to a downstream end at a discharge end of the housing. The housing has a one piece construction and is made of an electrically insulative material. The spraying assembly also includes an electrode assembly. The electrode assembly includes a plurality of elongate electrode elements each of which is disposed in a respective one of the discharge passageways in the housing and an electrode header. The electrode header is electrically connectable to a voltage source and each of the electrode elements is electrically connectable to the electrode header.

17 Claims, 7 Drawing Sheets

ELECTROSTATIC SPRAY ASSEMBLY

CROSS-REFERENCE TO RELATED PATENT APPLICATIONS

This patent application claims the benefit of U.S. Provisional Patent Application No. 60/544,269 filed on Feb. 12, 2004.

FIELD OF THE INVENTION

The present invention relates generally to spray nozzle assemblies, and more particularly, to electrostatic spray nozzle assemblies that electrostatically charge fluids discharging from spray nozzles to facilitate liquid particle breakdown and distribution.

BACKGROUND OF THE INVENTION

Figure 1:
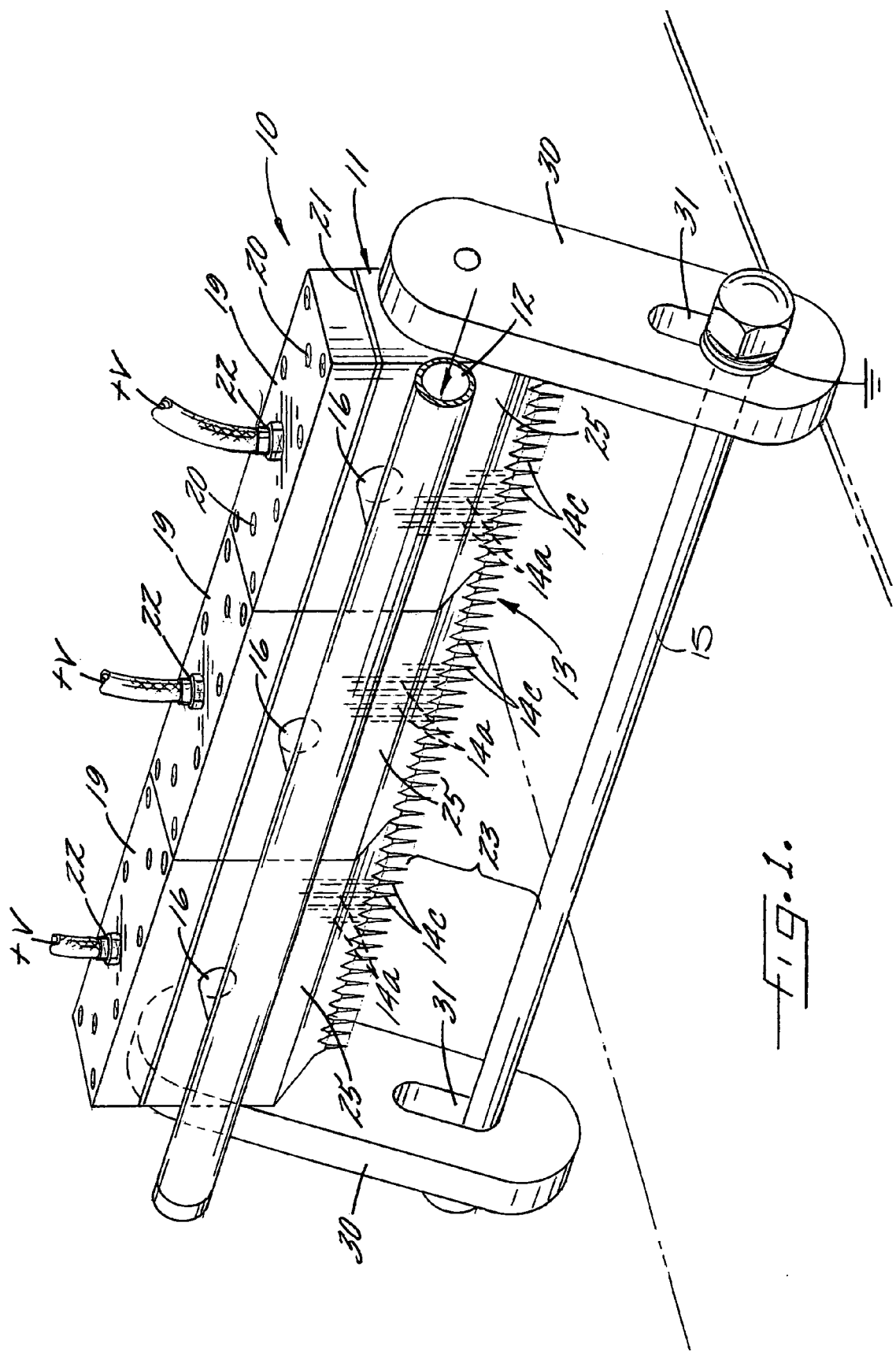
Figure 2:
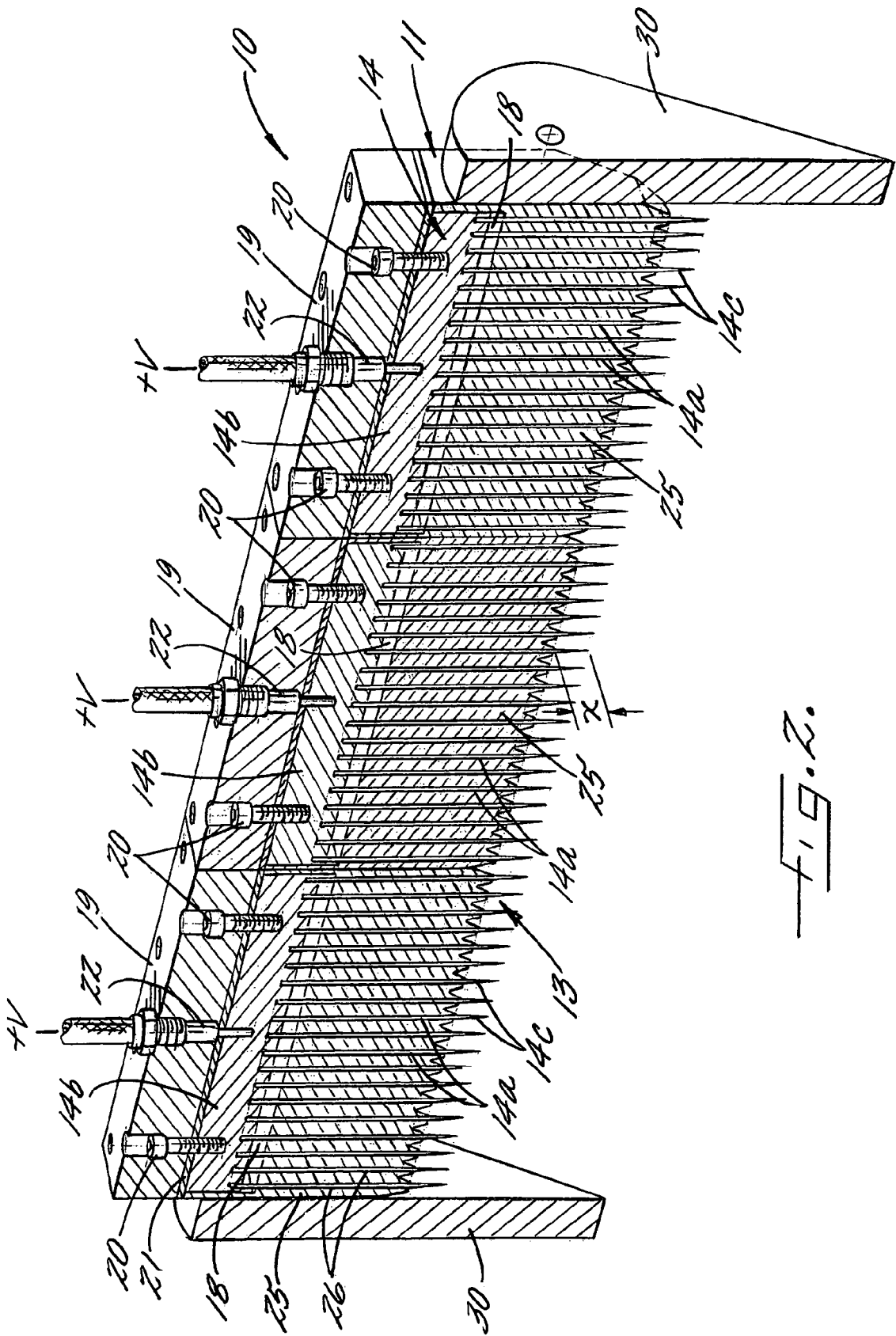
Figure 3:
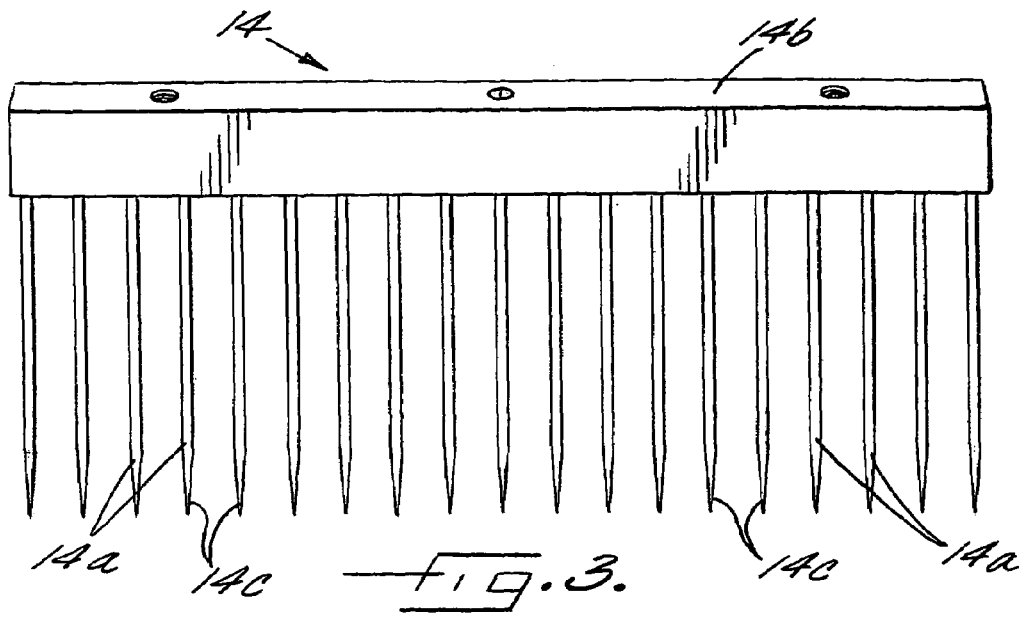
Figure 4:
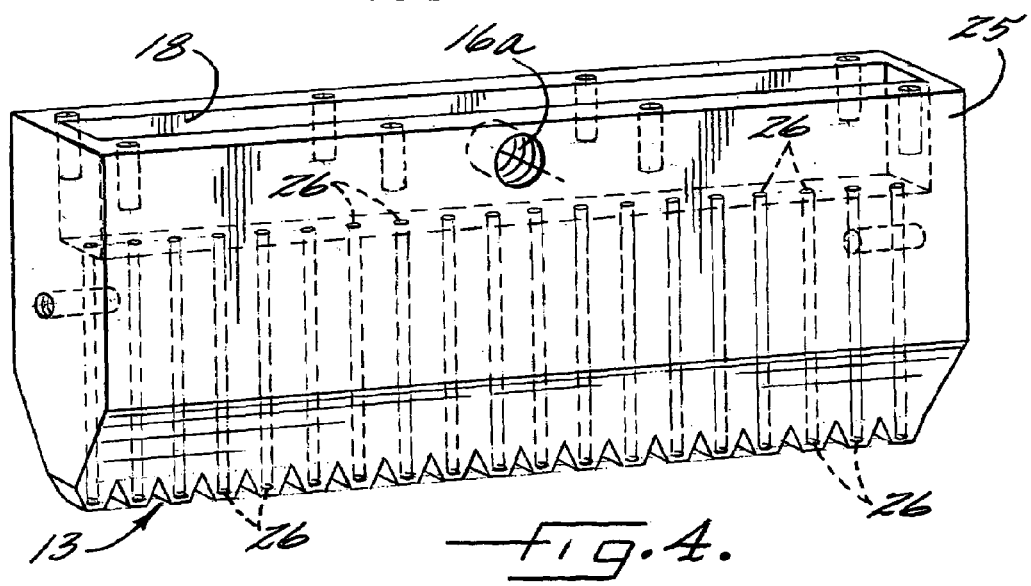
Figure 5:
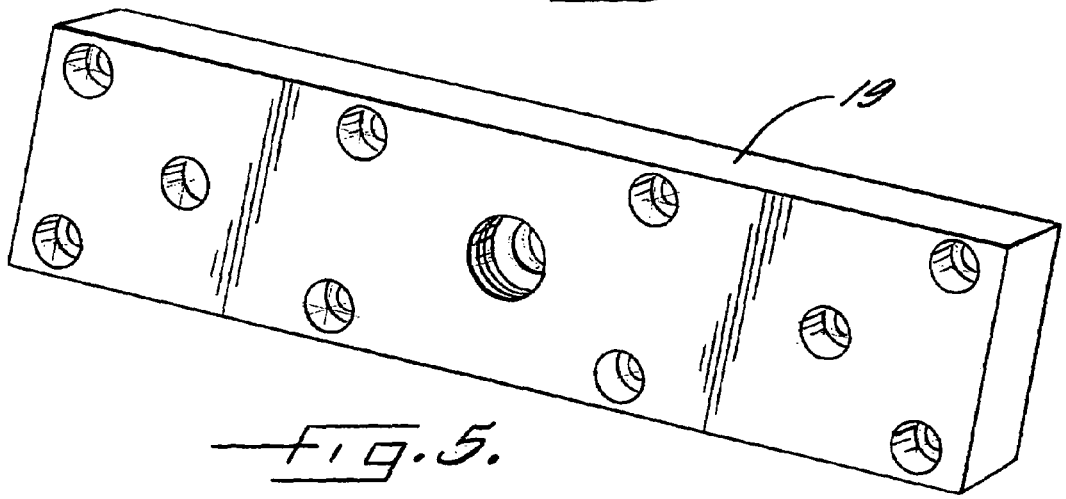
Figure 6:
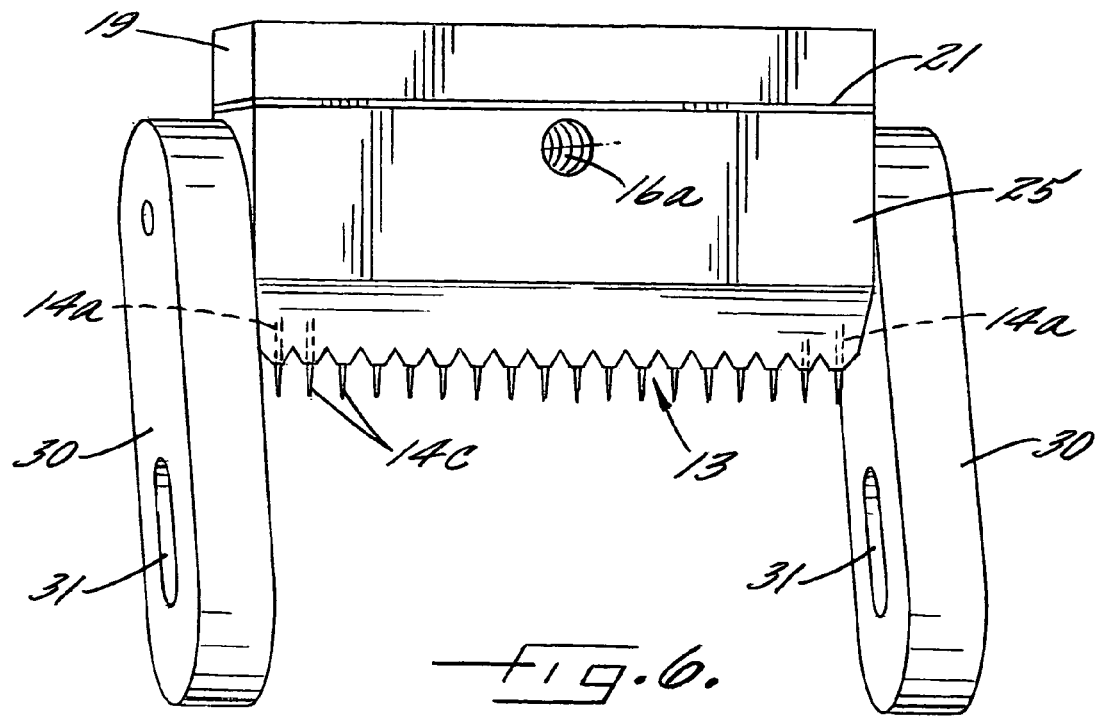
Figure 7:
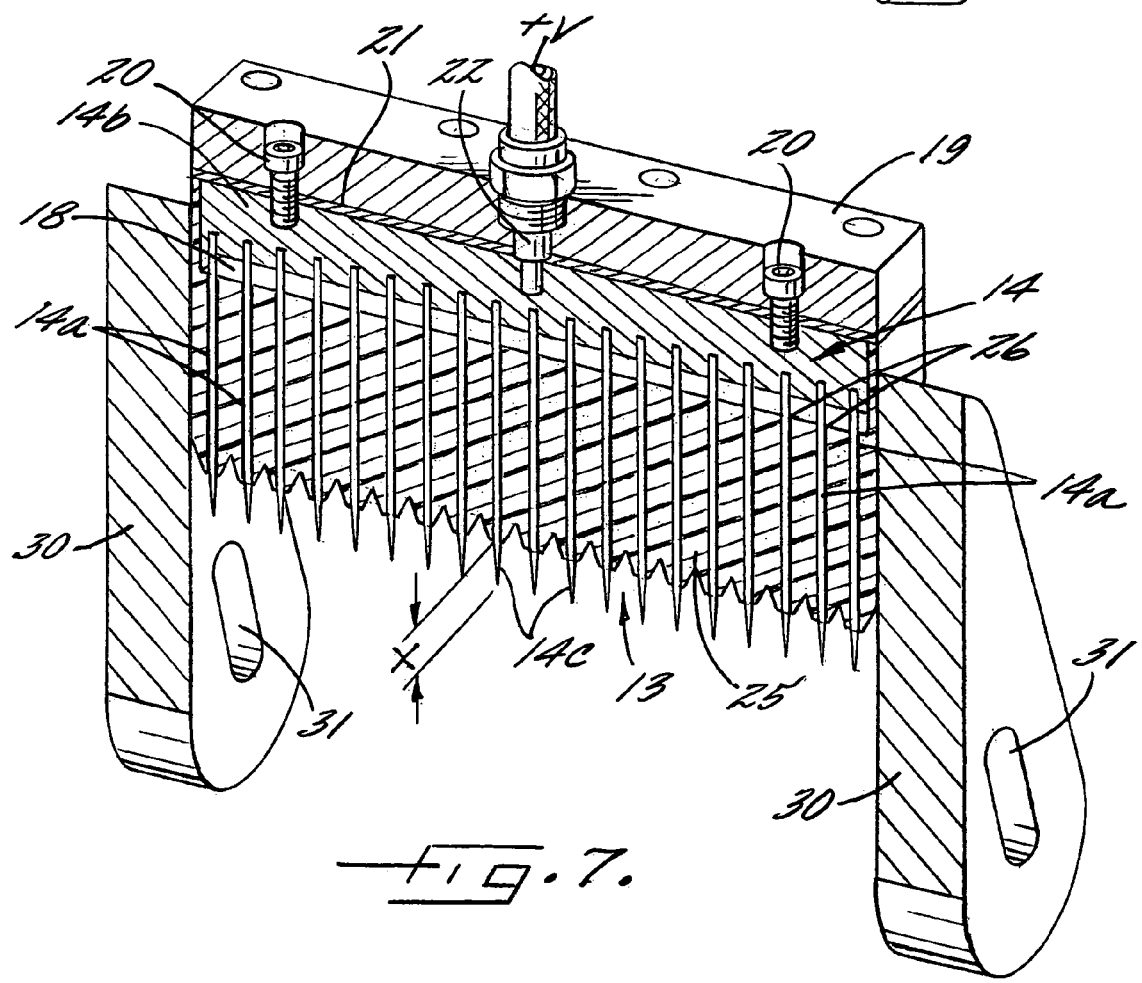
Figure 8:
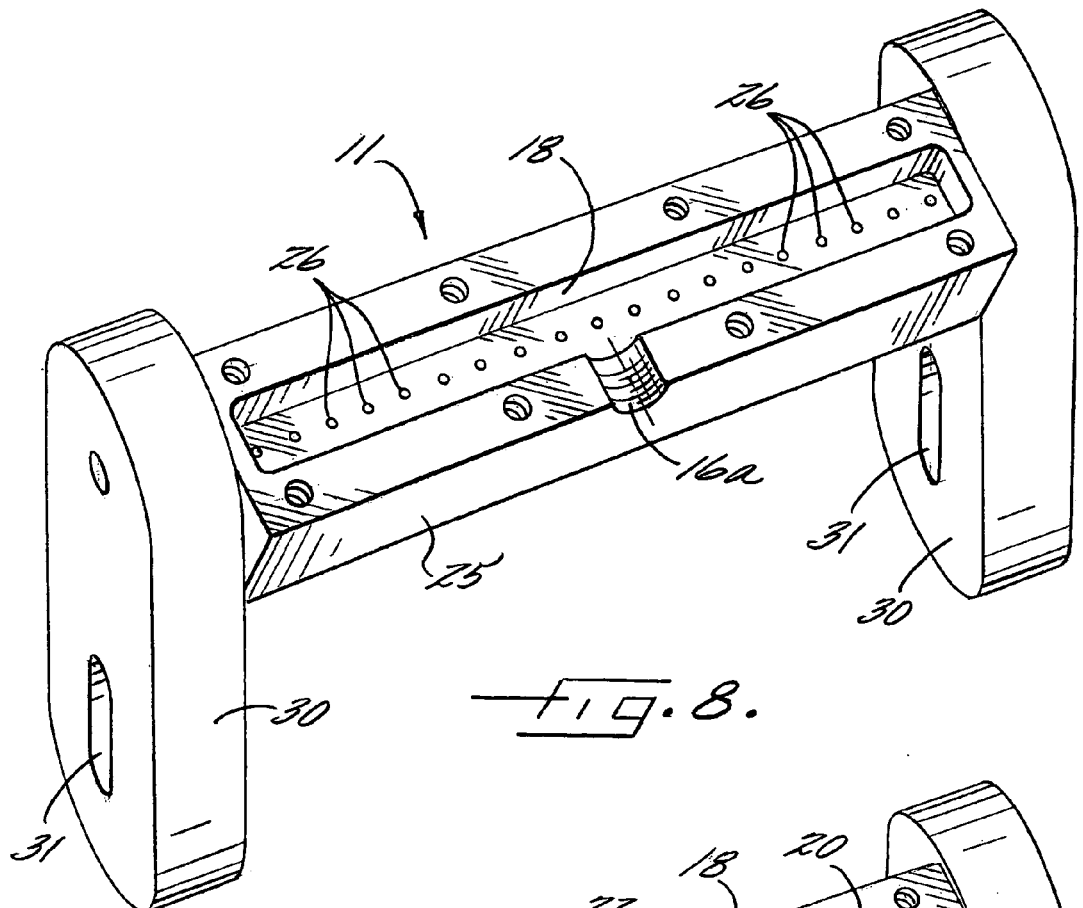
Figure 9:
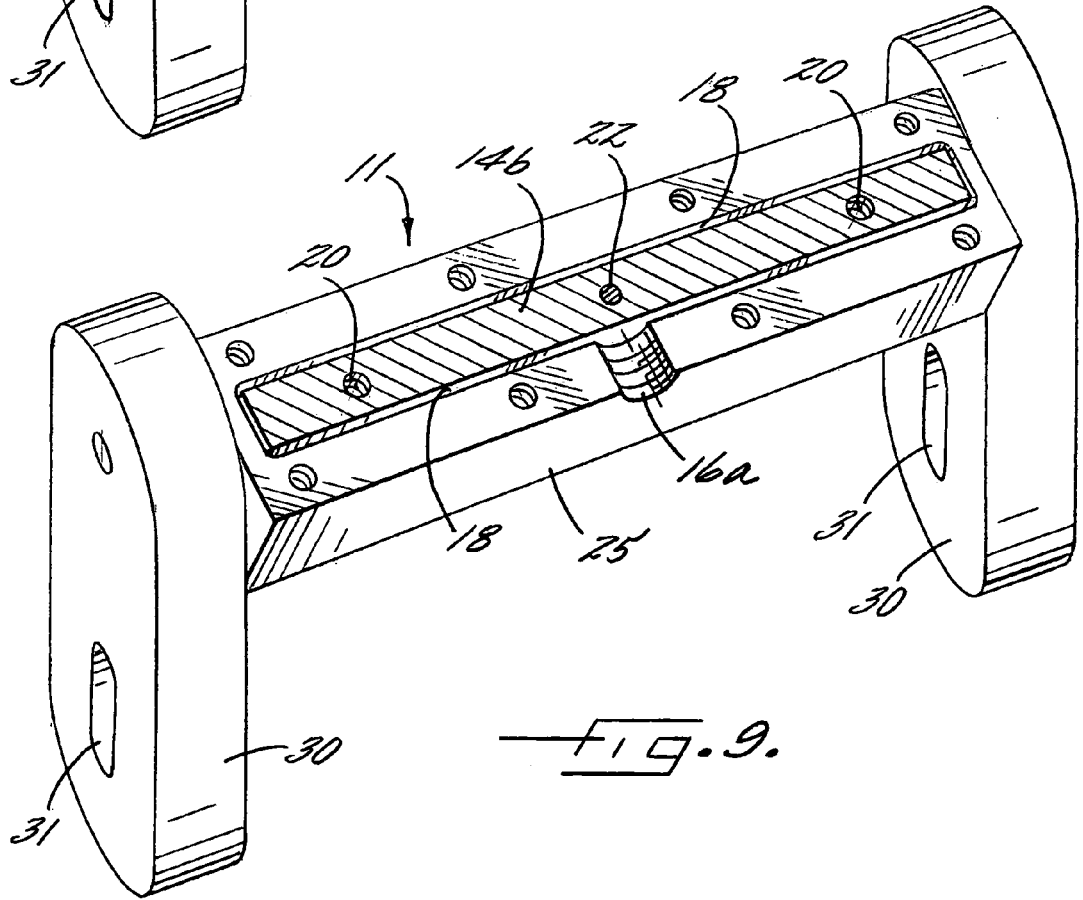
Figure 10:
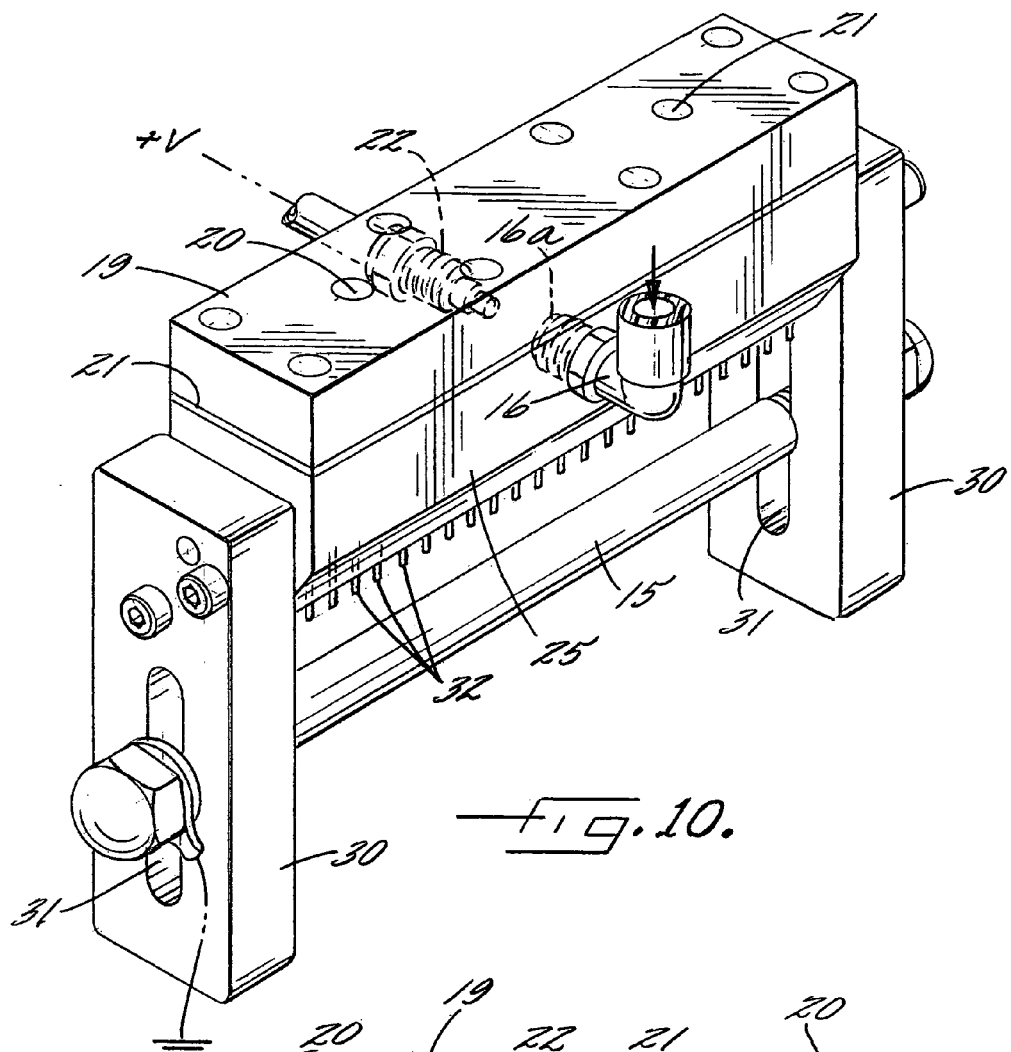

Electrostatic spray nozzle assemblies are utilized for applying oil and other coating and lubricating fluids in various manufacturing processes. Electrostatic spray nozzle assemblies, such as shown in U.S. Pat. No. 4,749,125, discharge a plurality of fluid flow streams which are electrostatically charged and atomized by means of a high voltage electrode with the assistance of a grounded induction bar for disposition onto items to be sprayed or coated, typically as they are conveyed past the spraying apparatus.

Heretofore, such electrostatic assembly spray nozzle assemblies have suffered from various operating and maintenance problems. For example, imprecise manufacture and assembly of such spray nozzles and charging electrodes can result in high voltage leakage that can significantly affect the operating efficiency of the spray operation. Fluid leakage problems also can adversely affect the spray distribution and lead to waste of costly spray liquids.

OBJECTS AND SUMMARY OF THE INVENTION

It is an object of the present invention to provide an electrostatic spray nozzle assembly that is adapted for more efficient and reliable spraying of oils and other lubricating and coating fluids.

Another object is to provide an electrostatic spray nozzle assembly which includes electrostatic charging electrodes that are adapted for more precise manufacture and mounting within the nozzle assembly, and hence more efficient operation with reduced power consumption and increased life expectancy.

A further object is to provide an electrostatic spray nozzle assembly of the foregoing type which is operable for electrostatically charging a plurality of fluid flow streams for more uniformly coating or lubricating of items that are sprayed.

Still another object is to provide an electrostatic spray nozzle assembly of the above kind which is adapted for more effectively atomizing the fluid flow streams so as to produce a uniform fine particle distribution onto items being sprayed.

Still another object is to provide an electrostatic spray nozzle assembly that can have relatively large fluid passages that resist clogging and are easy to clean.

Still another object is to provide an electrostatic spray nozzle assembly that requires a relatively low voltage at the nozzle tip thereby improving safety and reducing the tendency of sparking.

Yet another object is to provide such an electrostatic spray nozzle assembly which is relative simple in construction and lends itself to economical manufacture.

Other objects and advantages of the invention will become apparent upon reading the following detailed description and upon reference to the drawings, in which:

BRIEF DESCRIPTION OF THE DRAWINGS

FIG. 1 is a perspective view of an illustrative spray nozzle assembly in accordance with the invention;

FIG. 2 is a partial vertical section view of the spray nozzle assembly shown in FIG. 1;

FIG. 3 is a perspective view of an electrode needled assembly utilized in the illustrated electrostatic spray nozzle assembly;

FIG. 4 is a perspective view of a housing block used in the illustrated spray nozzle assembly;

FIG. 5 is a perspective view of a cover plate used in the illustrated spray nozzle assembly;

FIG. 6 is a perspective view of an alternative embodiment of electrostatic spray nozzle assembly in accordance with the invention.

FIG. 7 is a partial vertical section view of the spray nozzle assembly shown in FIG. 6;

FIG. 8 is a perspective view of the spray nozzle assembly shown in FIG. 6 with the cover and electrode assembly removed;

FIG. 9 is a perspective view, similar to FIG. 8, with the electrode inserted in the housing block;

FIG. 10 is a perspective view of still a further alternative embodiment of electrostatic spray nozzle assembly in accordance with the invention utilizing a different form of electrode assembly;

FIG. 11 is a vertical section view of the spray nozzle assembly shown in FIG. 10; and FIG. 12 is a perspective view in partial section of an alternative embodiment of electrostatic spray nozzle assembly which includes a single electrode pin.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention.

DETAILED DESCRIPTION OF PREFERRED EMBODIMENTS

Referring now more particularly to the drawings, there is shown in FIGS. 1 and 2 an illustrative electrostatic spraying assembly 10 embodying the present invention, which is adapted for directing an elongated spray of oil or other lubricating or coating fluid on items conveyed below the spray assembly 10. The illustrative spray nozzle assembly 10 basically comprises an elongated housing 11 supported in adjacent relation to a fluid supply pipe 12, an electrode assembly 14 for charging fluid passing through and directed from a lower discharge end 13 of the housing 11, and an induction bar 15 disposed in parallel spaced relation to the discharge end of the housing 11 for enhancing liquid particle breakdown. The housing 11 in this case is supported by the fluid supply pipe 12 by means of a plurality of transversely directed conduit sections 16 that communicate between the fluid supply pipe 12 and fluid inlet ports 16*a* in a side of the housing.

In accordance with an important aspect of the invention, the electrode assembly comprises a metallic block or header as well as a plurality of electrode elements in the form of pins each disposed within a respective fluid passageway communicating with the fluid inlet ports of the housing for charging fluid as it passes along the length of the pins and is discharged from the spray nozzle assembly. To this end, in the illustrated embodiment, the electrode 14 comprises a plurality of electrode pins 14a which are disposed in a longitudinally spaced array from a common header or strip 14b (see, e.g., FIGS. 2 and 3). Each electrode pin 14a, which in this instance is generally vertically oriented, is concentrically disposed in a respective fluid passageway 26 in the housing 11 (shown without the pins in FIG. 4) that is sized larger than the pin 14a such that an annular fluid flow passage is defined between the pin and the housing passage. The electrode 14 is made of a highly conductive metal material with the electrode pins 14a preferably being press fit within respective apertures within the electrode header 14b. The electrode header strip 14b in this case is disposed within a fluid inlet passage in the form of an elongated, longitudinal flow channel 18 of the housing 11 having a greater transverse width than the strip 14b (see, e.g., FIG. 2) for defining a longitudinal fluid flow passage communicating between the fluid inlet ports 16a of the housing and the annular fluid passages about the electrode pins 14a.

For enclosing the upper end of the elongated flow channel 18, the housing 11 has a cover 19 which is secured to the upper end of the housing 11 by appropriate fastening bolts with a sealing gasket 21 interposed there between. The header strip 14b of each electrode assembly 14 is retained in position within the flow channel 18 by bolts 20 which extend through the cover 19, and each electrode header strip 14b is connected to a high voltage line through a conventional banana coupling 22 (see FIG. 2).

Figure 11:
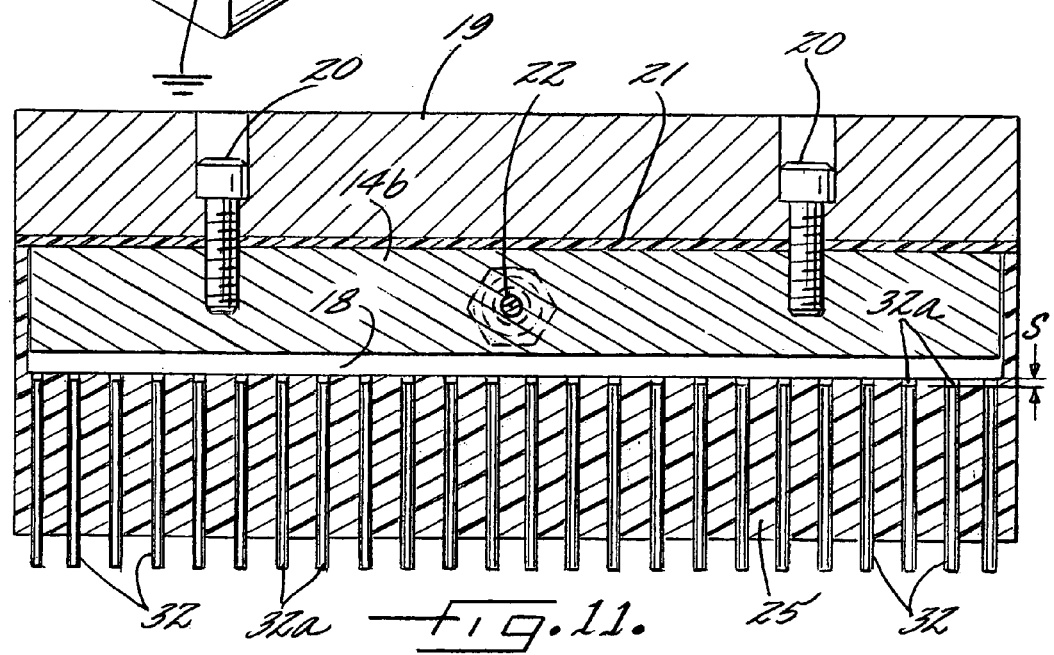

In keeping with the invention, the electrode pins 14a each terminate with a gradually tapered pointed end 14c which maximizes charging and ultimate liquid particle breakdown upon discharge from the spray assembly. While the theory of operation is not entirely understood, it is believed that the sharp points 14c of the pins 14a accumulate the electrical charge pursuant to a theory known as the Gauss theorem. The enhanced electrical charging of the fluid as it is directed along the pins 14*a* and discharged past the sharp pointed ends 14*c* further optimizes atomization and charging the fluid particles, which by virtue of their repelling nature, are more uniformly directed onto the items to be coated or lubricated. Hence, the pointed ends of the electrode pins 14*a* enhance the generation of smaller-sized fluid droplets, which is particularly important in airless electrostatic spraying systems.

The electrode pins 14*a* preferably each protrude outwardly of the discharge end of the housing 11 a predetermined distance "x," such as about ¼ inch (see FIG. 2). It has unexpectedly been found that the protruding electrode pin arrangement maximizes liquid flow rate through the spray nozzle assembly. Again, although the theory of operation is not entirely understood, it is believed that the greater surface area of pins over which the liquid travels facilitates liquid flow and discharge from the spray nozzle assembly. The increased contact with the electrode pins further enhances charging of the liquid and ultimate atomization. The housing 11 in this case is formed with a plurality of generally frustoconical exit points (see, e.g., FIGS. 2 and 7) through which the electrode pins 14*a* concentrically protrude for reducing the effect of surface tension on the liquid as it discharges from the housing about the electrode pins.

In carrying out a further important feature of the invention, the electrode receiving body of the housing 11 has a one-piece block construction which facilitates precision concentric mounting of the electrode pins 14*a* within the housing passageways and which prevents fluid and high voltage leakage. The illustrated housing 11 includes a one-piece body 25 (see, e.g., FIG. 4) preferably machined from plastic stock, with the pin receiving flow passageways 26 being drilled in the body and the longitudinal channel 18 being milled. It will be understood by one skilled in art that by virtue of such one-piece housing block construction, there are no parting planes associated with the liquid flow passageways 26 typical of multipart housings, nor fasteners for retaining a multi-part housing body in assembled condition at such parting planes. The resulting improved dimensional tolerances enhance even charging of the fluid as it travels along the perimeters of the elongated electrode pins 14*a.* As a result of the novel electrode design and arrangement, the electric spray nozzle assembly of the present invention has been found to have significantly improved operating efficiency over prior art spray devices of such type. For effecting spray performance comparable to such prior art spray devices, the subject electrostatic spray nozzle assembly has been found to be operable at 30 to 50 percent lower voltage requirements.

In the embodiment of FIGS. 1 and 2, it will be seen that the spray nozzle housing 11 includes three housing bodies 25 supported in a longitudinal array, each having a respective electrode assembly 14 comprising a header 14*b* and a plurality of pins 14*a,* and a respective cover 19. The fluid inlet port 16*a* of each electrode body 25 is coupled to the fluid supply pipe 12 by a respective conduit section 16. For purposes of illustration, the electrode assemblies are shown in partial section in FIG. 2 to depict the electrode pin arrangement. FIGS. 6-9 disclose a similar electrostatic spray nozzle assembly, but utilizing a single housing body 25, cover 19, and electrode assembly 14.

In carrying out a further feature of the invention, the induction bar 15 is mounted for selective positioning relative to the downstream ends of the electrode pins 14*a* for maximizing the effect of the electrical field therebetween on the discharging liquid, and hence, maximizing liquid particle breakdown. As shown in FIG. 1, the induction bar 15, in this case, is supported by elongated arms 30 fixed in depending angled relation to opposite ends of the housing 11. The induction rod 15 is selectively positionable within elongated slots 31 formed in the supporting arms 30 for effecting the desired spray characteristics.

In operation of the spray nozzle assembly 10, it will be seen that oil or other lubricating or coating fluid may be supplied through the liquid supply pipe 15 and communicate with housing inlet ports 16*a* through the conduit sections 16. The fluid entering the housing inlet ports will communicate through the longitudinal flow channel 18 to and through the depending flow passageways 26 in surrounding relation along the length of the electrode pins 14*a,* being charged along the entire length of travel. Upon discharge from the housing 11, the pointed ends 14*c* of the electrode pins 14*a* enhance charging of the discharging fluid, such that upon entering the electrical field 23 (see FIG. 1, for example) between the electrode pins 14*a* and the induction bar 15, the liquid is dispersed into fine particle spray with the repelling charges of the particles effecting substantially uniform distribution onto items passing below the spray nozzle assembly 10 to be coated.

While in the embodiment illustrated in FIGS. 1-9, fluid is electrically charged by passage about the electrode pins 14*a,* alternatively, as depicted in FIGS. 10 and 11, fluid may be directed through the electrode itself. To this end, the electrode can include a plurality of electrode tubes 32 having flow passages extending therethrough. With the FIGS. 10 and 11 arrangement, fluid may be directed through the flow passages in the electrode tubes 32 and discharged from flow openings at their terminal ends 32a. As the fluid passes through the electrode tubes 32, it is charged such that when the fluid exits the tubes and enters the electrical field between the terminal ends 32a of the tubes and the induction bar 15, the fluid is dispersed into a fine particle spray. The use of the electrode tubes 32 provides relatively large flow passages that are more resistant to clogging and are easier to clean. Moreover, according to a further aspect of the invention, to enhance safety, the electrode tubes 32 can be arranged such that each tube terminates a small distance S (FIG. 11) from the electrode block or header 14b inside the longitudinal fluid inlet channel 18 of the housing. As a result of this arrangement, the electrode tubes 32 are not in direct electrical contact with the electrode block or header. With this arrangement, the electrode tubes 32 will not be charged at a high electrical potential that could pose a safety hazard. Instead, the electrode tubes are charged inductively due to their proximity to the electrode header 14b. The inductive charging of the electrode tubes 32 will provide sufficient charging to provide the desired level of added charge to the fluid passing through the tubes 32. Accordingly, safety of the spray operation is increased without significant degradation in spray performance.

Figure 12:
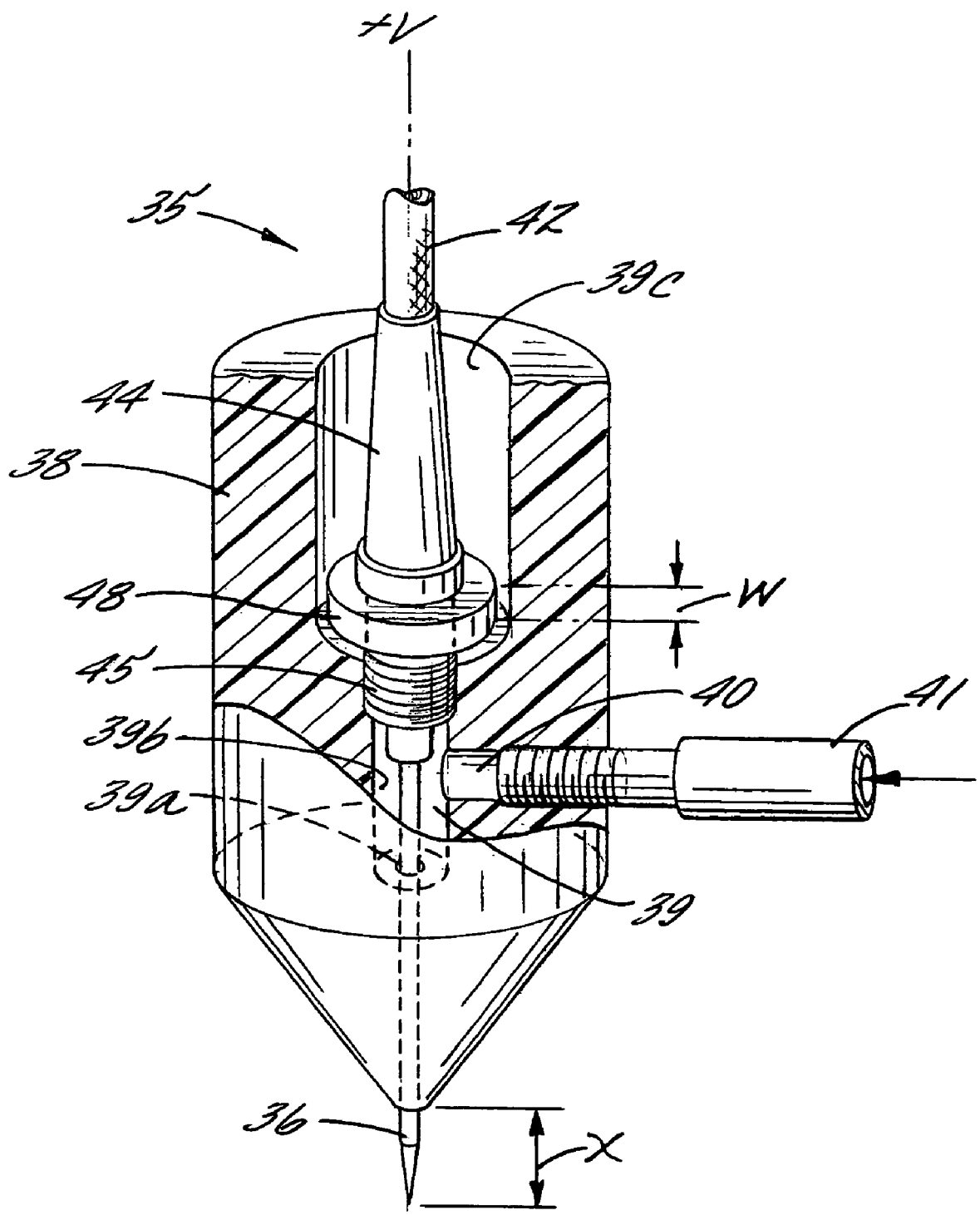

Referring now more particularly to FIG. 12 of the drawings, there is shown an alternative embodiment of the spray nozzle assembly 35 in accordance with the invention, which utilizes a single electrode pin 36. The spray nozzle assembly 35 again includes a one-piece housing body 38, in this case having gun shape with an upstream cylindrical end portion and a downstream frustoconical end portion. The housing body 38, which again can be machined from plastic stock material, has longitudinal passageway 39 which includes a relatively small diameter downstream passageway section 39*a* within which the electrode pin 36 is concentrically mounted for defining an annular liquid flow passage similar to that described previously. The longitudinal passageway 39 includes an enlarged diameter passageway section 39*b* which communicates with a radial inlet port 40 to which a fluid supply conduit 41 is connected. The passageway 39 further includes an enlarged counter bore section 39*c* at the upstream end of the body 38 within which a high voltage line 42 connects with an upstream end of the electrode pin 36 through a banana coupling 44. The electrode pin 36 in this case has an enlarged threaded steam portion 45 to facilitate coupling with the high voltage supply line.

In carrying out a further feature of the invention, the electrode pin 36 in this case is selectively positionable within the passageway section 39*a* for the desired spray and liquid flow rate to be generated by the spray nozzle assembly. To this end, a washer configured shim 48 having a selectively determined longitudinal width "w" is interposed between the high voltage coupling and a downstream end wall of the enlarged counter bore section 39*c* for selectively locating the electrode pin 36 within the passageway 39*a*, and hence, selectively establishing the distance "x" the electrode pin 36 extends beyond the downstream end of the housing body 38. It will be seen that a thicker shim 48 will lead to reduced exposed needle surface at the tip of the nozzle body 38, and hence decrease the flow rate. Thinner shims 48 will enable a greater exposed needle surface area at the tip of the nozzle body and hence, increase the flow rate. In this manner, an optimum flow rate can be readily established through selection of desired shim width.

From the foregoing, it can be seen that the electrostatic spray nozzle assembly of the present invention is adapted for a more efficient and reliable spraying of oils and other lubricating and coating fluids. The spray nozzle assembly includes electrostatic charging electrodes that are adapted for more precision manufacture and mounting within the nozzle housing, and hence, more efficient operation with reduced power consumption and increased life expectancy. The spray nozzle assembly further is effective for more effectively optimizing fluid flow streams for uniform fine particle distribution onto the sprayed items.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An electrostatic spraying assembly comprising:

a housing having a fluid inlet passage that is connectable to a fluid source and communicates with a plurality of first passageways each of which extends through the housing to a downstream end at a discharge end of the housing, said housing having a one piece housing body made of an electrically insulative material, said housing body being formed with an elongated internal channel disposed between front and rear housing walls and end walls at opposite ends of said channel, the whole of said one piece housing body including said front, rear and opposite end walls, a cover enclosing a top end of said housing body and elongated channel; and an electrode assembly including an elongated electrode header disposed in said internal channel and a plurality of elongate electrode elements each of which is supported in coaxial relation to and within a respective one of said first passageways in the housing, said internal channel defining a flow passageway between said fluid inlet passage and said first passageways for directing fluid to said first passageways and into contacting relation with said electrode elements, and said electrode header being electrically connectable to a voltage source for electrically charging said electrode elements and liquid flowing in contact therewith prior to discharge of the liquid from the spraying assembly.

2. The electrostatic spraying assembly of claim 1 wherein the electrode elements comprise pins each having a gradually tapered pointed end and being arranged in the respective first passageway such that fluid can flow through the first passageway around the electrode element.

3. The electrostatic spraying assembly of claim 1 wherein the electrode elements comprise tubes each having an fluid passageway extending therethrough that is in fluid communication with the fluid inlet passage in the housing and a terminal end through which fluid can be discharged.

4. The electrostatic spraying assembly of claim 1 wherein each of the electrode elements protrudes outwardly beyond the discharge end of the housing.

5. The electrostatic spraying assembly of claim 1 wherein each of the electrode elements is attached to the electrode header.

6. The electrostatic spraying assembly of claim 1 wherein each of the electrode elements is arranged in spaced relation from and not in direct electrical contact with the electrode header such that the electrode elements are charged inductively by the electrode header.

7. The electrostatic spraying assembly of claim 1 further including an induction element supported adjacent to the discharge end of the housing.

8. The electrostatic spraying assembly of claim 7 wherein the induction element is carried by support arms such that the position of the induction element relative to the discharge end of the housing can be selectively adjusted.

9. An electrostatic spraying assembly comprising:
a housing having a fluid inlet passage that is connectable to a fluid source and a plurality of first passageways each of which extends though the housing to a downstream end at a discharge end of the housing; and
an electrode assembly including an electrode header and a plurality of metallic elongated hollow electrode tubes each of which is disposed within a respective one of the first passageways in the housing such that each electrode tube extends though at least substantially the entire length and out a lower end of the respective first passageway with a first portion of the electrode tube being arranged in the respective first passageway and a second portion of the electrode tube protruding out of the respective first passageway with the second portion of the electrode tube having a length relatively shorter than a length of the first portion; said electrode tubes each defining a fluid passageway extending therethrough which is in communication with the fluid inlet passage in the housing and having a terminal end through which fluid can be discharged, and said electrode header being electrically connectable to a voltage source for electrically charging the electrode tubes and fluid passing through the tubes prior to discharge from the spray assembly.

10. The electrostatic spraying assembly of claim 9 further including an induction element supported adjacent to the discharge end of the housing.

11. The electrostatic spraying assembly of claim 9 wherein the induction element is carried by support arms such that the position of the induction element relative to the discharge end of the housing can be selectively adjusted.

12. The electrostatic spraying assembly of claim 9 wherein the electrode header is arranged in the fluid inlet passage.

13. The electrostatic spraying assembly of claim 9 in which said electrode tubes protrude a distance of about ¼ inch from said housing.

14. The electrostatic spraying assembly of claim 9 in which each of said electrode tubes is supported in spaced apart relation from and not in direct electrical contact with the electrode header such that the electrode tubes are charged inductively by the electrode header.

15. The electrostatic spraying assembly of claim 9 in which said electrode tubes define a constant diameter cylindrical passageway from a location within said housing to a discharge end of the electrode tube from which fluid is directed from the spraying assembly.

16. An electrostatic spraying assembly for spraying oils and other coating fluids comprising:
a housing having a fluid inlet passage that is connectable to a fluid source and a plurality of first passageways each of which extends through the housing to a downstream end at a discharge end of the housing; and
an electrode assembly including an electrode header and a plurality of metallic elongated hollow electrode tubes each of which is disposed within a respective one of the first passageways in the housing; said electrode tubes each being fixedly mounted within a respective first passageway for defining a constant diameter cylindrical passageway from a location within said housing to a discharge end of the tube, and said electrode header being electrically connectable to a voltage source for electrically charging the electrode tubes and fluid passing through the tubes prior to discharge from the spray assembly, and a single induction rod supported in predetermined relation to a discharge end of said electrode tubes for singularly creating an electrical field for enhancing fluid particle breakdown of fluid discharging from the electrode tubes, said electrode header comprising a metallic block having a width greater than the diameter of the cylindrical passageway.

17. An electrostatic spraying assembly comprising:
a housing made of an electrically insulative material having a fluid inlet passage that is connectable to a fluid source and a plurality of first passageways each of which extends through the housing to a downstream end at a discharge end of the housing; and
an electrode assembly including an electrode header and a plurality of metallic elongated hollow electrode tubes each supported by said housing in coaxial relation to and at least partially within a respective one of said first passageways, said electrode-tubes each defining a fluid passageway extending therethrough which is in communication with the fluid inlet passage in the housing and having a terminal end from which fluid is discharged, said electrode header being electrically connectable to a voltage source, and said electrode tubes each being supported in spaced apart relation from and not in direct electrical contact with the electrode header such that the electrode tubes are charged inductively by the electrode header and in turn charge fluid passing through the electrode tubes prior to discharge from said spraying assembly.

* * * * *